US012533827B2

(12) United States Patent
Koppes et al.

(10) Patent No.: US 12,533,827 B2
(45) Date of Patent: Jan. 27, 2026

(54) SCORING DEVICE AND METHODS FOR SETTING AXIAL POSITION AND GAP DIMENSION

(71) Applicant: MAXCESS INTERNATIONAL CORPORATION, Oak Brook, IL (US)

(72) Inventors: Eric Koppes, Edmond, OK (US); Aaron Powers, Vancouver, WA (US); Brady Johnson, Kalama, WA (US); Frank Fang, Portland, OR (US); Casey Stevens, Vancouver, WA (US); Dave Purkerson, Washougal, WA (US); Levi Wilson, Oklahoma City, OK (US)

(73) Assignee: MAXCESS INTERNATIONAL CORPORATION, Oak Brook, IL (US)

( * ) Notice: Subject to any disclaimer, the term of this patent is extended or adjusted under 35 U.S.C. 154(b) by 293 days.

(21) Appl. No.: 18/466,462

(22) Filed: Sep. 13, 2023

(65) Prior Publication Data

US 2024/0083063 A1 Mar. 14, 2024

Related U.S. Application Data

(60) Provisional application No. 63/375,483, filed on Sep. 13, 2022.

(51) Int. Cl.

| | |
|---|---|
| ***B26D 7/26*** | (2006.01) |
| ***B26D 3/08*** | (2006.01) |
| ***B26D 5/00*** | (2006.01) |

(52) U.S. Cl.

CPC ........... *B26D 7/2635* (2013.01); *B26D 3/085* (2013.01); *B26D 5/005* (2013.01)

(58) Field of Classification Search

CPC .............................. B26D 7/2635; B26D 3/085

See application file for complete search history.

(56) References Cited

U.S. PATENT DOCUMENTS

| | | | | |
|---|---|---|---|---|
| 5,212,647 | A | 5/1993 | Raney et al. | |
| 6,012,366 | A * | 1/2000 | Shimizu | B26D 1/245 83/145 |
| 6,100,989 | A | 8/2000 | Luwa | |

(Continued)

FOREIGN PATENT DOCUMENTS

| | | | |
|---|---|---|---|
| DE | 102013208909 | A1 | 11/2014 |
| DE | 102015116198 | A1 | 3/2017 |

(Continued)

*Primary Examiner* — Sean M Michalski

(74) *Attorney, Agent, or Firm* — McNees Wallace & Nurick LLC

(57) ABSTRACT

A method for setting an axial position and gap dimension of a gap between one or more score blades and an anvil shaft of a rotary scoring device, includes providing a control system including a controller, at least one sensor, and at least one adjusting device actuated by the control system, and actuating the at least one adjusting device in response to the at least one sensor sensing a deviation from a desired state, thereby setting the axial position or the gap dimension between the one or more score blades and the anvil shaft. The method further includes actuating the at least one adjusting device is achieved as a result of the control system operating in a closed feedback loop, and sensing by the at least one sensor occurring with or without disruption of operation of the rotary scoring device.

22 Claims, 16 Drawing Sheets

(56) References Cited

U.S. PATENT DOCUMENTS

| | | | | |
|---|---|---|---|---|
| 6,112,658 | A | 9/2000 | Gunther et al. | |
| 6,556,291 | B2 | 4/2003 | Yonezawa | |
| 6,950,547 | B2 | 9/2005 | Floeder et al. | |
| 7,027,934 | B2 | 4/2006 | Skeps et al. | |
| 7,333,650 | B2 | 2/2008 | Yamamoto et al. | |
| 8,167,293 | B2 * | 5/2012 | Lewalski | B65H 5/18 270/52.17 |
| 8,281,694 | B2 | 10/2012 | Okihara | |
| 8,485,512 | B2 * | 7/2013 | Lewalski | B26D 7/015 270/52.17 |
| 8,935,104 | B2 | 1/2015 | Floeder et al. | |
| 9,061,435 | B1 | 6/2015 | Proudfoot et al. | |
| 9,738,004 | B2 | 8/2017 | Ebrecht | |
| 9,969,191 | B2 | 5/2018 | Masubuchi et al. | |
| 10,115,040 | B2 | 10/2018 | Brauer | |
| 10,346,969 | B1 | 7/2019 | Raghu et al. | |
| 10,395,362 | B2 | 8/2019 | Gupta et al. | |
| 10,599,951 | B2 | 3/2020 | Bhaskar et al. | |
| 10,634,621 | B2 | 4/2020 | Kano et al. | |
| 2001/0002560 | A1 * | 6/2001 | Aoki | B26D 7/2635 83/13 |
| 2001/0031079 | A1 | 10/2001 | Ryder | |
| 2002/0191831 | A1 | 12/2002 | Spoto et al. | |
| 2004/0231476 | A1 * | 11/2004 | Weber | B26D 7/2635 83/13 |
| 2008/0022821 | A1 | 1/2008 | Hendrik | |
| 2008/0026090 | A1 | 1/2008 | Ehrbar | |
| 2011/0049781 | A1 * | 3/2011 | Lewalski | B26D 9/00 271/265.01 |
| 2012/0098184 | A1 * | 4/2012 | Lewalski | B65H 9/16 271/145 |
| 2013/0152750 | A1 * | 6/2013 | Chilcott | B26D 7/2635 83/56 |
| 2014/0116215 | A1 * | 5/2014 | Kwarta | B26F 1/20 83/76.1 |
| 2014/0116218 | A1 * | 5/2014 | Kwarta | B26D 7/2635 83/562 |
| 2017/0322186 | A1 | 11/2017 | Su et al. | |
| 2018/0281218 | A1 | 10/2018 | Urrutia Nebreda et al. | |
| 2019/0025805 | A1 | 1/2019 | Cella et al. | |
| 2019/0041845 | A1 | 2/2019 | Cella et al. | |
| 2019/0121350 | A1 | 4/2019 | Cella et al. | |
| 2019/0129405 | A1 | 5/2019 | Cella et al. | |
| 2019/0129408 | A1 | 5/2019 | Cella et al. | |
| 2019/0137985 | A1 | 5/2019 | Cella et al. | |
| 2019/0146474 | A1 | 5/2019 | Cella et al. | |
| 2019/0146478 | A1 | 5/2019 | Cella et al. | |
| 2019/0197679 | A1 | 6/2019 | Fang et al. | |
| 2019/0318469 | A1 | 10/2019 | Wang | |
| 2020/0005070 | A1 | 1/2020 | Ambikapathi et al. | |
| 2020/0005141 | A1 | 1/2020 | Ambikapathi et al. | |
| 2020/0020094 | A1 | 1/2020 | Chang | |
| 2020/0096994 | A1 | 3/2020 | Cella et al. | |
| 2020/0103890 | A1 | 4/2020 | Cella et al. | |
| 2020/0110397 | A1 | 4/2020 | Cella et al. | |
| 2020/0110399 | A1 | 4/2020 | Cella et al. | |
| 2020/0254644 | A1 | 8/2020 | de Natris | |
| 2022/0314481 | A1 | 10/2022 | Schomber, Jr. et al. | |

FOREIGN PATENT DOCUMENTS

| | | | |
|---|---|---|---|
| DE | 102017122071 | A1 | 3/2019 |
| EP | 1676681 | A1 | 7/2006 |
| EP | 2058092 | A1 | 5/2009 |
| EP | 3147089 | A1 | 3/2017 |
| WO | 2008043497 | A1 | 4/2008 |
| WO | 2011095228 | A1 | 8/2011 |
| WO | 2016070053 | A1 | 5/2016 |
| WO | 2018165753 | A1 | 9/2018 |
| WO | 2019057254 | A1 | 3/2019 |
| WO | 2019107614 | A1 | 6/2019 |
| WO | 2019215746 | A1 | 11/2019 |
| WO | 2019219598 | A1 | 11/2019 |
| WO | 2019239283 | A1 | 12/2019 |
| WO | 2020048119 | A1 | 3/2020 |
| WO | 2020048248 | A1 | 3/2020 |
| WO | 2020053139 | A1 | 3/2020 |
| WO | 2020079568 | A1 | 4/2020 |

* cited by examiner

SCORING DEVICE AND METHODS FOR SETTING AXIAL POSITION AND GAP DIMENSION

CROSS REFERENCE TO RELATED APPLICATION

This application claims priority to U.S. Provisional Application 63/375,483 entitled "Scoring Device and Methods for Setting Axial Position and Gap Dimension," filed Sep. 13, 2022, the disclosure being incorporated herein by reference.

FIELD OF DISCLOSURE

The present disclosure is directed to a scoring apparatus and methods for controlling the scoring apparatus. More specifically, the present disclosure is directed to a scoring apparatus and methods for setting axial position and gap dimension of a gap between one or more score blades and an anvil shaft of the scoring apparatus.

BACKGROUND

Operational and quality control of (back or top) scoring processes is highly desirable in manufacturing. Control schemes for this process have been in large part manual in nature. Although control schemes involving the use of electrical actuators has recently gained popularity, control schemes using feedback to achieve fully automated control have received little attention. Additionally, when switching between different materials or substrates for the scoring process, different control schemes are required. However, such control schemes require operators to make process modification determinations, typically requiring shutting down operation of the production line, which is inefficient, disruptive, and costly.

Therefore, there is a need in the art for a scoring apparatus and control schemes that do not suffer from the above shortcomings.

SUMMARY

In an example embodiment, a method for setting an axial position and gap dimension of a gap between one or more score blades and an anvil shaft of a rotary scoring device includes providing a control system including a controller, at least one sensor, and at least one adjusting device actuated by the control system, and actuating the at least one adjusting device in response to the at least one sensor sensing a deviation from a desired state, thereby setting the axial position or the gap dimension between the one or more score blades and the anvil shaft. The method further includes actuating the at least one adjusting device is achieved as a result of the control system operating in a closed feedback loop. The method further includes sensing by the at least one sensor occurring with or without disruption of operation of the rotary scoring device.

In another example embodiment, a method for operating a rotary scoring device includes feeding a material web to be treated into a feed of the rotary scoring device, sending data associated with at least one characteristic property of the material web, measured by at least one sensor, to a control unit, operating an adjusting device to adjust an axial position between two score blades, operating a motor to adjust a gap dimension between the two score blades and an anvil shaft, and setting the axial position and the gap dimension between the two score blades and the anvil shaft to a desired location to treat the material web. The motor includes an encoder to send a feedback signal, to determine at least one of speed, RPM, count, distance or direction.

In yet another example embodiment, a method for setting a gap of a rotary die cutting system includes providing a control system including a controller, at least one sensor, a first adjusting device, and a second adjusting device, each actuated by the control system, actuating the first adjusting device in response to the at least one sensor sensing a deviation from a desired state, thereby setting a gap dimension between a rotary die cutting device and a counter pressure cylinder of a rotary die cutting device, and actuating the second adjusting device in response to the at least one sensor sensing a deviation from a desired state, thereby setting an axial position and a gap dimension between one or more score blades and an anvil shaft of a rotary scoring device. The method further includes the rotary scoring device positioned in series with respect to the rotary die cutting device. The method further includes actuating the second adjusting device is achieved as a result of the control system operating in a closed feedback loop. The method further includes sensing by the at least one sensor occurring with or without disruption of operation of the rotary die cutting system.

In yet another example embodiment, a rotary scoring device includes a frame including at least one blade holder, containing a score blade therein, and an anvil shaft, the at least one blade is separated from the anvil shaft by a gap, and a control system including a controller, at least one sensor, and a first adjusting device and a second adjusting device actuated by the control system. The first and second adjusting devices are operably connected to the at least one blade holder to adjust an axial position.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF EXAMPLE EMBODIMENTS

The present invention provides a scoring process that is less prone to human error and reduces downtime/costs associated with setup, improves safety by reducing operators from working inside of the scoring machines during operation, eliminates blade damage (during the setup process), reduces scrap of materials, extends blade life & produces higher quality and consistent product, and/or increases throughput by eliminating stoppages to address the aforementioned problems. In addition, lateral positioning and scoring depth cut formed in a material passing between one or more blades and an anvil roller of a rotary scoring device is automatically controlled by employing a saved material library and job features. As such, repeatable and accurate results of the lateral positioning and cut- to depths of the blades from the saved material library and job saved features is achieved.

As described herein, "scoring" is an industry known process of partially cutting into a sheet or material to allow a subsequent bending, folding, creasing, tearing or peeling of the sheet or material. That is, rather than cutting entirely through the sheet or material, scoring leaves a blade impression, indent, or partial cut at a single stress point. The score produced typically only penetrates or cuts partially through the material which reduces the thickness at the stress point, or fully through one or more layers of a multi-layer material while leaving one or more layers intact.

In some implementations, the exemplary rotary scoring system performs a kiss cut such that the cut material stays married to a support material. That is, a kiss cut is to cut only one layer of material, leaving the support material untouched, wherein the end user can remove the cut material out from the support material. The cut goes just deep enough to penetrate the top surface leaving the backer support material intact. Coupons, sticker sheets or pull-back reveals are great examples where kiss cutting technique is used.

The exemplary rotary scoring system described herein performs a top (fully cut through the material face leaving the liner intact) or back (fully cut through the material liner leaving the face intact) scoring.

Figure 1:
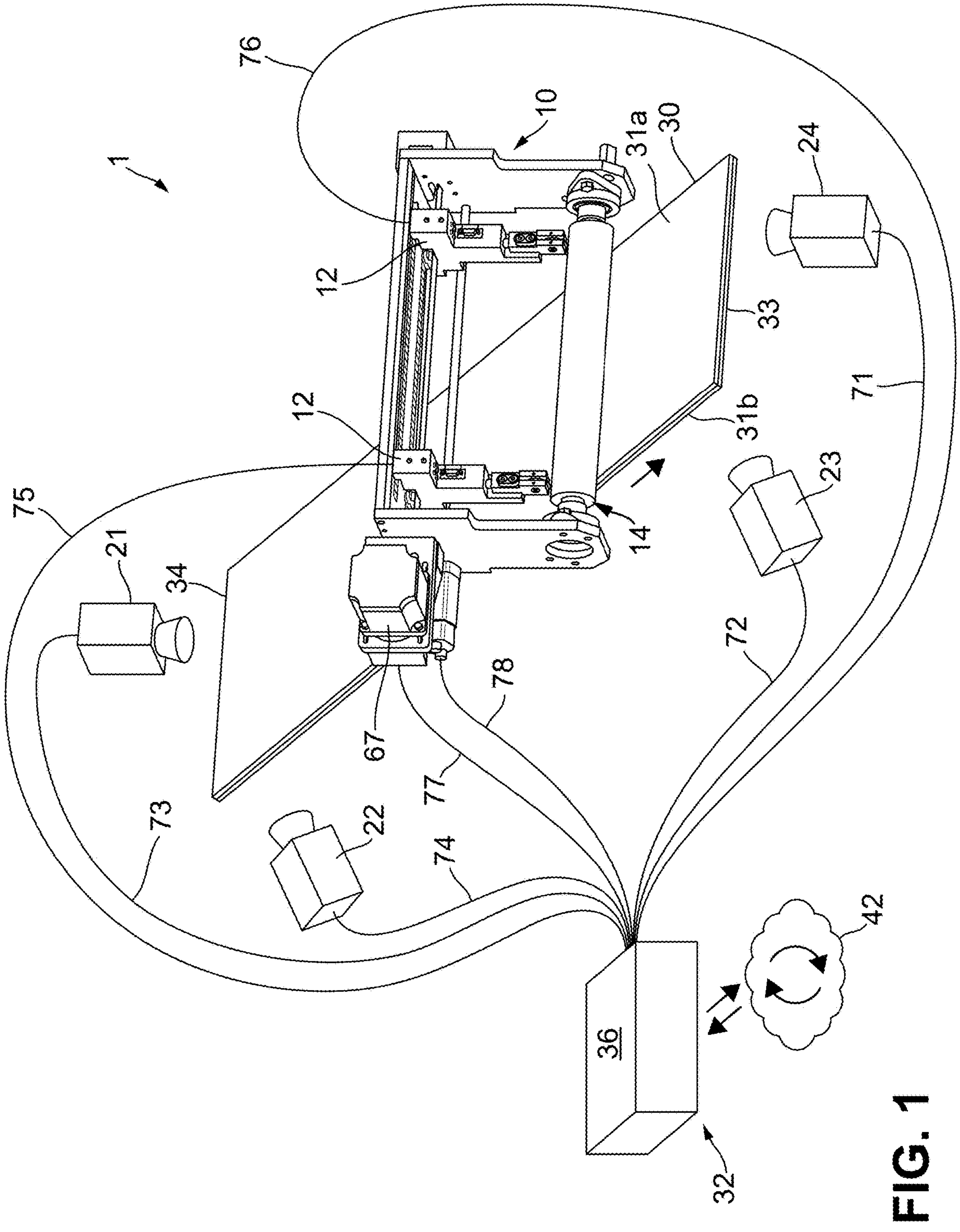
FIG. 1 is a perspective view of an exemplary rotary scoring system, according to an example embodiment of the present disclosure.
Figure 2:
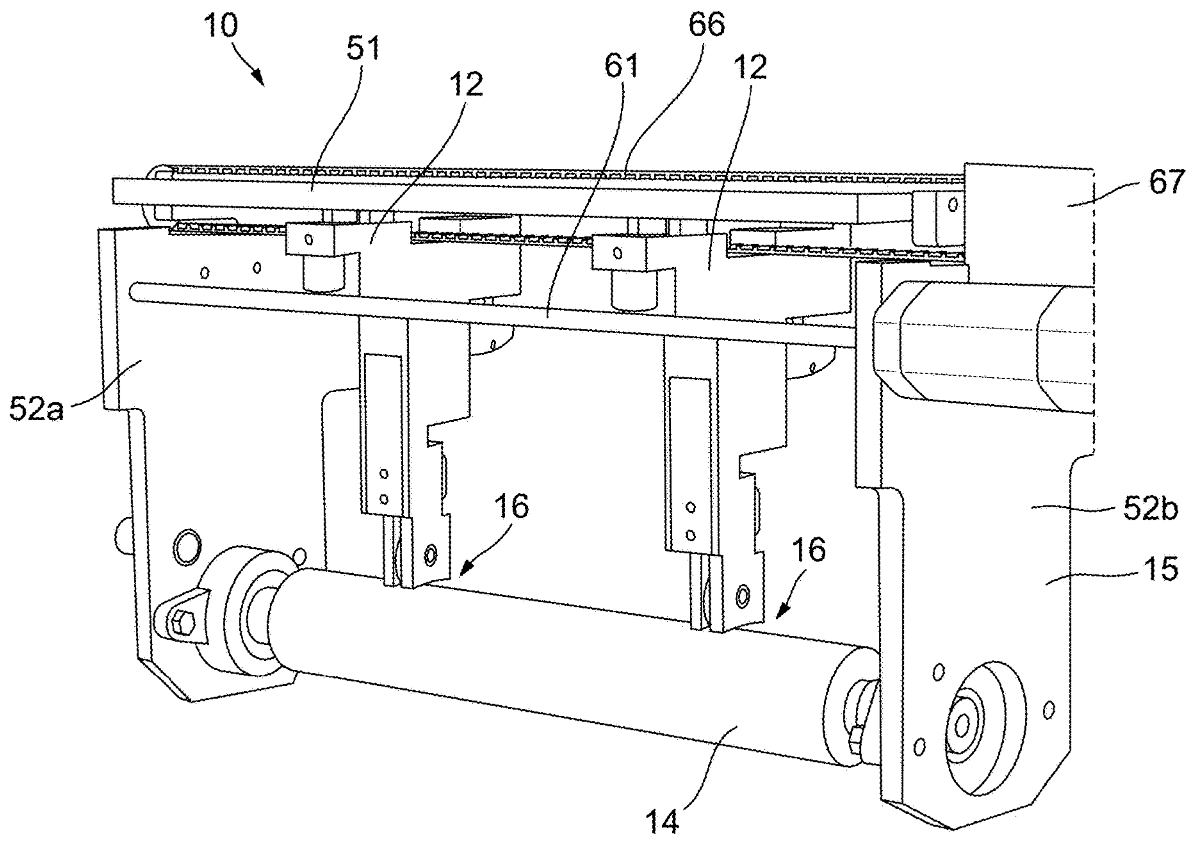
FIG. 2 is a perspective front view of an exemplary rotary scoring device, according to an example embodiment of the present disclosure.
Figure 5:
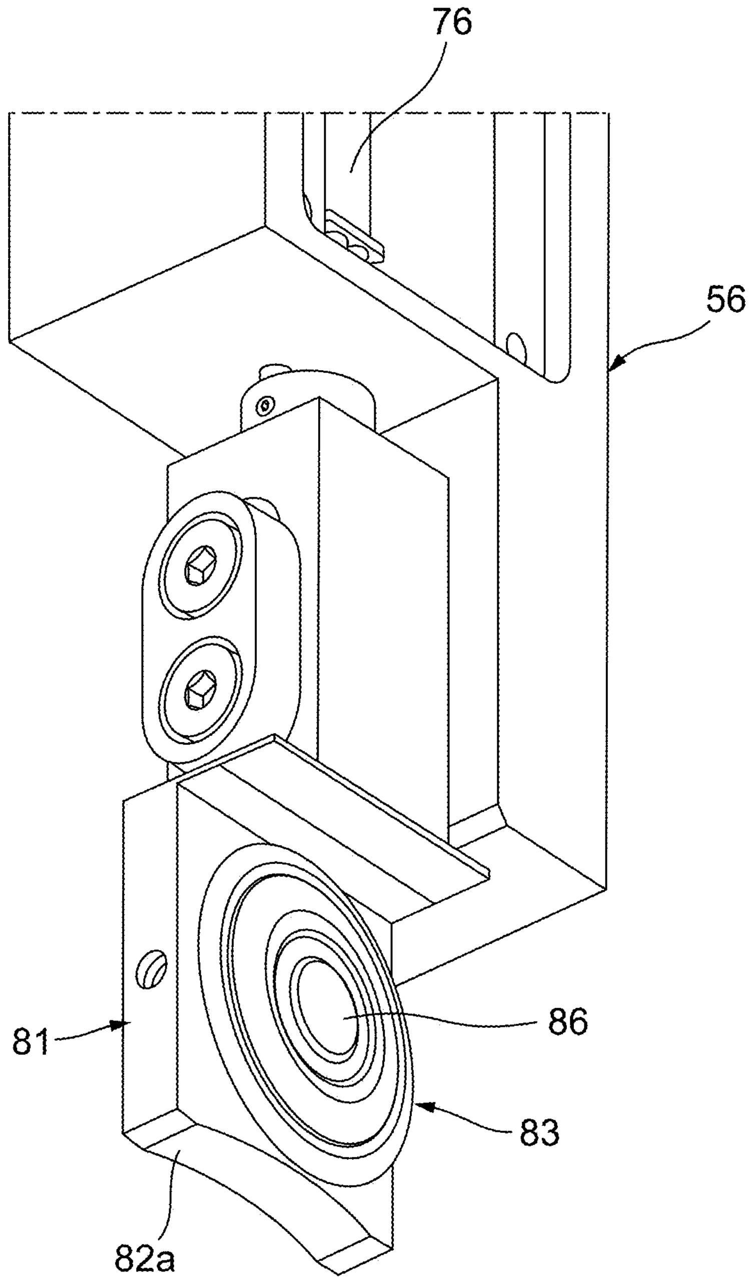
FIG. 5 is a partial perspective lower view of an exemplary blade holder, according to an example embodiment of the present disclosure.

FIG. 1 shows an exemplary rotary scoring system 1 including a rotary scoring device 10 comprising two blade holders 12 and a counter pressure cylinder 14 (or anvil shaft) separated from the two blade holders 12 by a gap 16 (FIG. 2). Stated another way, gap 16 is the distance between score blades 83 (FIG. 5) of blade holders 12 and the anvil shaft 14. The rotary scoring system 1 further comprises a control unit 32 including a controller 36 functionally coupled to a plurality of sensors 21, 22, 23, 24 for determining at least one characteristic property of a material 30 to be treated or of the scoring device 10. Such characteristic property could be type of material 30 being treated, thickness of a specific material 30 or of specific parts of the material 30. In such a way, the sensor(s) 21, 22, 23, 24 can determine a thickness profile of each material 30 and transmit such data to the control unit 32 which operates the blade holders 12 using information provided by the sensor(s) 21, 22, 23, 24. As such, it is possible to treat the materials, having individual and/or varying thickness in the scoring device 10 direction. The gap 16 between the blades 83 and the anvil roll 14 can then be adjusted such as to always ensure the correct contact pressure of the scoring operation. In some implementations, sensor(s) 21, 22, 23, 24 can also be used to determine the exact position of a leading end 33 or trailing end 34 of the material 30 fed to the rotary scoring system 1. By way of example, sensor 24 can sense the leading end 33 of material 30 and sensor 21 can sense the trailing end 34 of material 30. In some implementations, sensor(s) 21, 22, 23, 24 comprises a line camera system. By way of example, sensor 23 can capture an image of the leading end 33 of material 30 and sensor 22 can capture an image of the trailing end 34 of material 30. In other implementations, sensor(s) 21, 22, 23, 24 may also be used for determining at least one characteristic property of the rotary scoring system 1, when the material 30 is presently treated. In other implementations, sensor(s) 21, 22, 23, 24 can be a gap sensor or a load cell sensor so as to sense misalignment or tolerance stack-ups that cause positional variation between the score blades 83 and the anvil shaft 14 depending on score blades 83 position along the anvil shaft 14.

Figure 6:
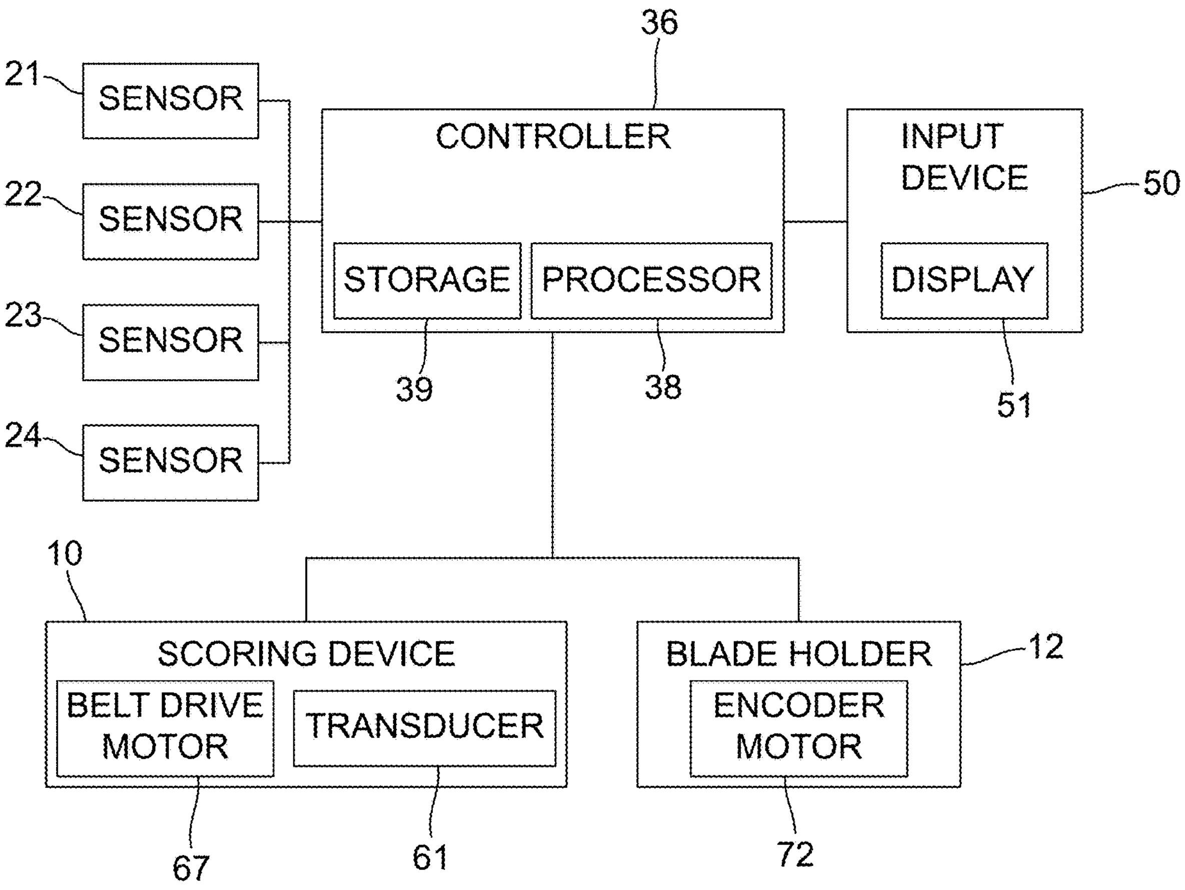
FIG. 6 is a schematic block diagram of a rotary scoring system, according to an example embodiment of the present disclosure.

In other implementations, sensor(s) 21, 22, 23, 24, as controlled by controller 36, measures the thickness of the material 30 that includes a face web material 31*a* and a backing web material 31*b* remaining subsequent to being directed between the blade holders 12 and the anvil shaft 14, which thickness measurement may occur subsequent to or prior to removal of the face web material 31*a*. Subsequently, a database of historical runs (stored in storage 39, as shown in FIG. 6)) corresponding with the same or similar material 30 and thickness can be used to lookup what gap 16 was used to produce desirable results in the past. Moreover, controller 36 is adapted or configured to provide alerts/logging information and receive historical run data or updates to software or firmware from the storage 39 or storage device such as cloud storage or the Internet of Things ("IoT") as is well known and not further discussed herein.

It is to be understood that a deviation from a desired state as a result of a change in thickness of at least one of the backing web 31*b* and overlying web 31*a* may also be due to thermal expansion of web material or of equipment, a change in humidity of an environment surrounding rotary scoring device 10, a change in a tension gradient of at least one of the backing web 31*b* and overlying web 31*a*, a cut depth of score blades 83 and the material 30, and an impression quality of score blades 83 and material 30 or other reasons.

Each of the sensors 21, 22, 23, 24 is connected to the controller 36 via respective conduits 71, 72, 73, 74, which may be hardwired or wireless communicated therebetween. For example, the controller 36 can communicate with the sensors 21, 22, 23, 24 over a serial connection or the controller 36 can wirelessly communicate with the sensors 21, 22, 23, 24, such as Bluetooth, Wi-Fi, RF transmission, GPS, or the like.

Sensors 21, 22, 23, 24 are used to provide a closed feedback loop, utilizing the sensors to permit continuous or undisrupted operation of the scoring process.

In some implementations, information from one or all sensors of one or all embodiments is transmitted to and from controller 36, including an IoT framework, an onsite network infrastructure or on a local media located in controller 36.

Figure 3:
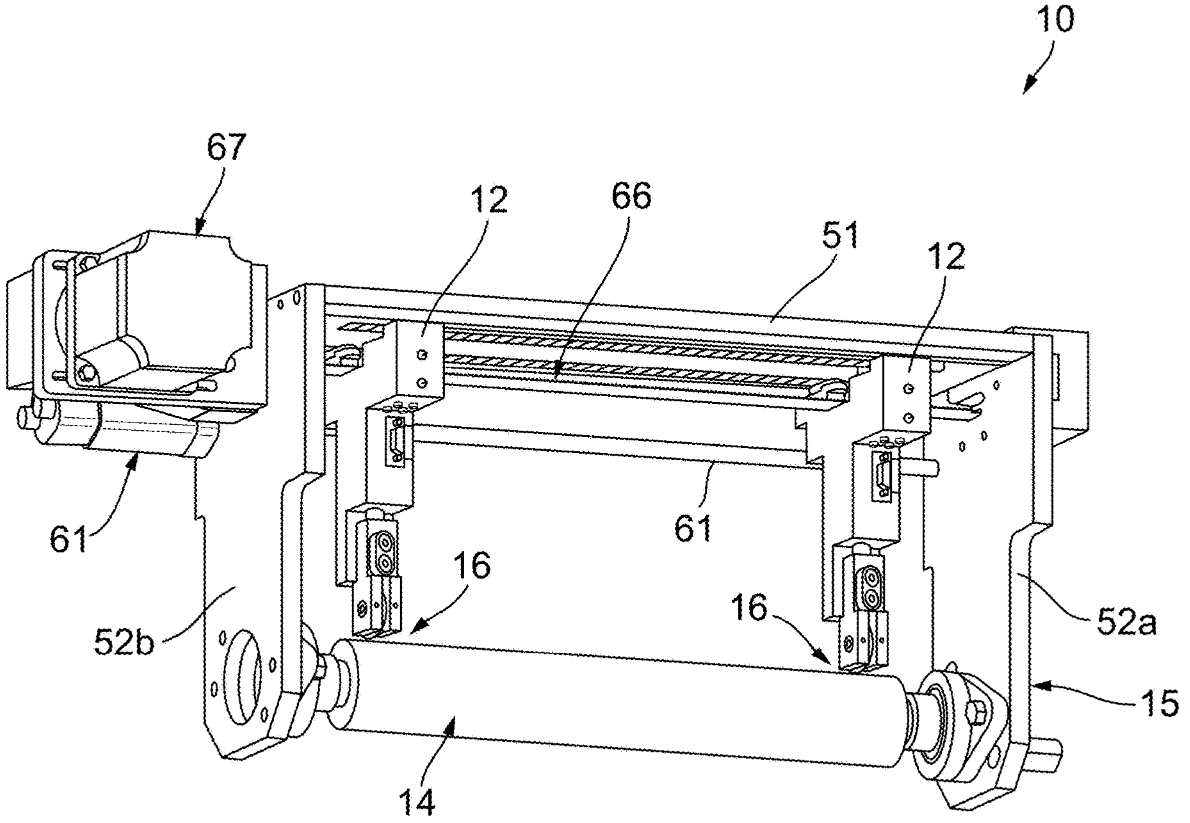
FIG. 3 is a perspective back view of an exemplary rotary scoring device, according to an example embodiment of the present disclosure.

Referring to FIGS. 2 and 3, the blade holders 12 and anvil shaft 14 are supported and surrounded by a frame 15 made from stainless steel, for example. The frame 15 is designed as a flush side frame mounting member so as to directly mount to a side frame of a machine in which no additional cut outs are required for mounting. The frame 15 includes a top portion 51 connected therebetween by two side portions 52*a*, 52*b* for supporting an electromagnetic transducer 61 for measuring the lateral positions of the blade holders 12 and a driving system 65 for translating (moving) the blade holders 12 in a lateral direction. In one implementation, the driving system 65 is a belt drive 66 driven by an electric motor 67, such as, for example, a stepper motor, a hydraulic motor or other suitable power source operably connected to belt drive 66 for moving the blade holders 12 into a desired position. In other implementations, the driving system 65 can be a rack and pinion system including at least a circular gear engaging a linear gear for linear actuation. It should be appreciated that other driving systems can be employed, not described herein.

Figure 4:
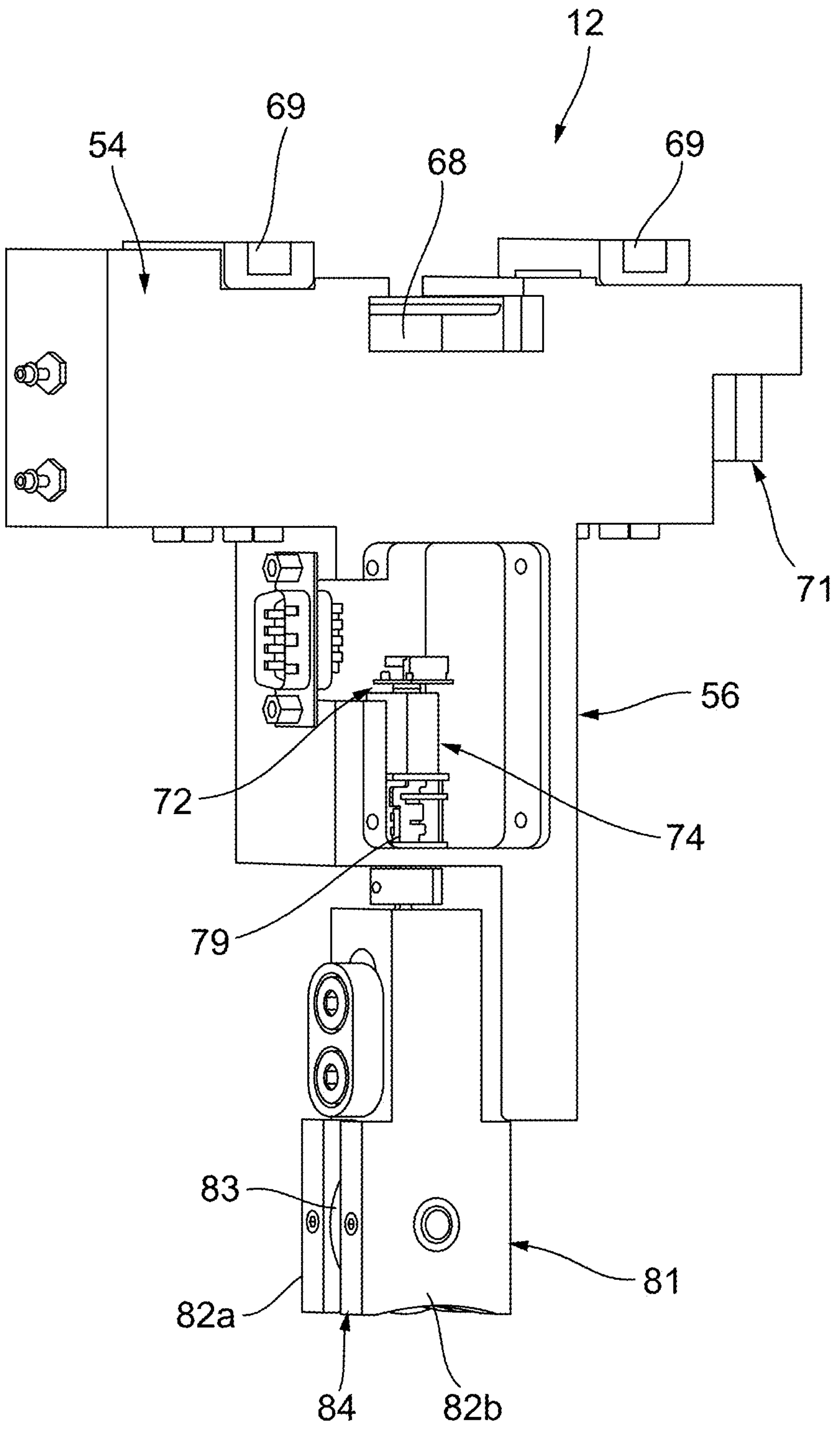
FIG. 4 is a perspective view of an exemplary blade holder, according to an example embodiment of the present disclosure.

Referring to FIG. 4 (illustrating only one blade holder), the blade holder 12 includes a top housing portion 54 and a bottom housing portion 56. The top housing portion 54 is configured to receive the belt drive 66 via opening 68 and a pair of attachment members 69 for connecting the blade holder 12 to the frame 15, more specifically, to a bottom surface of the top portion 51 of frame 15. Near the top housing portion 54 includes an electromagnet 71 associated with the electromagnetic transducer 61 for operation.

The bottom housing portion 56 houses a motor encoder 72 (or rotary encoder) mounted to an electric motor 74 that provides closed loop feedback signals, controlled by controller 36, by tracking the position of a motor shaft 79. The encoder 72 is used to provide high speed and with high accuracy to the blade holder 12. In other implementations, in addition to positioning, the encoder 72 can send a feedback signal, to determine speed, RPM, count, distance, and/or direction.

In one implementation, the accuracy of the scoring can be approximately 0.0004 inch, dependent upon the material used. By way of example, a tested accuracy of 0.004 inch can be achieved for a vinyl face material and a test accuracy of 0.0002 can be achieved for a polypropylene face material. In other implementations, the scoring can be independent upon the material used. For example, when using a motor with an integrated gear box and encoder an accuracy can be achieved including up to 4×10-6 inches.

Near a lower portion of the bottom housing portion 56, a blade housing 81 is attached thereto. The blade housing 81 holds the score blade 83 (FIG. 5) for scoring (or impression) the material 30. The blade housing 81 includes a first housing 82*a* and a second housing 82 to cover and protect the blade 83. The score blade 83 extends or retracts between an opening 84 created between the first housing 82*a* and the second housing 82. The score blade 83 includes a metal-shielded bearing (not shown) to ensure precision and accuracy. The score blade 83 can be replaceable by unlocking a fastening device 86 for replacement.

The electromagnetic transducer 61, as controlled by controller 36 via conduit 78 or via wireless communication therebetween, measures linear displacement or movement of the blade holders 12. Subsequently, controller 36 operates the electric motor 67 via conduit 77 or via wireless communication therebetween to drive the belt drive 66 and move the blade holder 12 into a desired lateral location. Similarly, the controller 36 operates the motor encoders 72 via conduits 75, 76 or via wireless communication therebetween to move the respective score blades 83 into a desired cut-to depth for scoring. In some implementations, a database of historical runs (stored in storage 39) corresponding with the same or similar material 30, for example, is used to lookup what gap 16 was used to produce desirable results in the past. An algorithm in the controller 36 determines the signal to send to the motor encoder 72 in the blade holders 12 via conduits 75, 76 or via wireless communication therebetween in order to achieve the same gap 16 that was returned from the database in storage 39. It should be appreciated that the database may include parameters such as, material name, material type, material serial number or identifier, material caliper, material basis weight, material tensile strength, material elasticity, machine measurements, individual score blade diameter, machine settings, or conditions at the time a parameter was saved, for example.

FIG. 6 is a schematic representation of the exemplary rotary scoring system 1, according to an example embodiment. In the schematic representation, the controller 36 may be communicatively coupled to each sensor 21, 22, 23, 24, the storing device 10, the blade holder 12, and/or the input device 50. In one implementation, the controller 36 may be a computing system that includes a processor 38 and a storage system 39. The storage system 39 includes software, including stored data, including data in database structure. In one implementation, the stored data can be library of previously used materials including its configurations or parameters, e.g., saved setup combinations of axial position or gap dimension between the score blades and the anvil shaft, based on the saved parameters and/or configurations. The processor 38 loads and executes software, which is a software application stored in the storage system 39. The processor 38 can also access data stored in the database in order to carry out the methods and control instructions described herein. Although the controller 36 is depicted as one, unitary system encapsulating one processor 38 and one storage system 39, it should be appreciated that one or more storage systems 39 and one or more processors 38, may comprise the controller 36, which can be a cloud computing application and system. The processor 38 includes a processor, which may be a microprocessor, a general-purpose central processing unit, an application-specific processor, a microcontroller, or any type of logic device. The processor 38 may also include circuitry for retrieving and executing software. It should be appreciated that the processor 38 may be implemented with a single processing device, but may also be distributed across multiple processing devices or subsystems that cooperate in executing software instructions.

The storage system 39 comprises any storage media, or group of storage media, readable by processor 38, and capable of storing software and data. The storage system 39 can include volatile and non-volatile, removable and non-removable media implemented in any method or technology for storage of information, such as computer-readable instructions, data structures, program modules, or other data. The storage system 39 may store a set of processor instructions or algorithm, which when executed by the controller 36 enables automatic operation of the rotary scoring system 1. Examples of the non-volatile memory may include, but are not limited to, a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM) and Static Random-Access memory (SRAM).

In one implementation, the controller 36 provides control instructions to the scoring device 10 via conduits 77, 78 or wireless communication therebetween, that is executed by a belt drive motor controller which controls movements of the belt drive 61. By way of example, the control instructions may move the two blade holders 12 via the belt drive 61 laterally to their respective desired positions. The control instructions may further provide instructions to the motor encoder 72 to control the movement of the blade 83 to a desired cut depth position. More specifically, the controller 36 provides instructions to the motor encoder 72 to control the motor 74 for movements of the shaft 79 which then controls the blade 83 in a linear movement (i.e., up-and-down).

In some implementation, the controller 36 may receive control instructions from an input device 50 which may include a display 51 to display information executable by the controller 36, which will be described in detail later. The display 51 is a graphical user interface (i.e., touchscreen display) that can be displayed on a device, such as a computer, a laptop, a television, a smart phone, etc. In one implementation, the controller 36 is adapted or configured to receive historical run data or updates of selected material to operate the scoring function.

In other implementations, the controller 36 processes input nodes of a neural network 100 (FIG. 7D) located in the processor 38 and/or storage 39. By way of example, the neural network 100 classifies the scores or impressions of a corresponding material according to predefined categories. The classified score from the neural network is compared to a desired result and an error is determined. An algorithm in controller 36 uses the error to determine the signal to send to the score device 10 and/or the blade holder 12 in order to achieve the desired result.

Figure 7A:
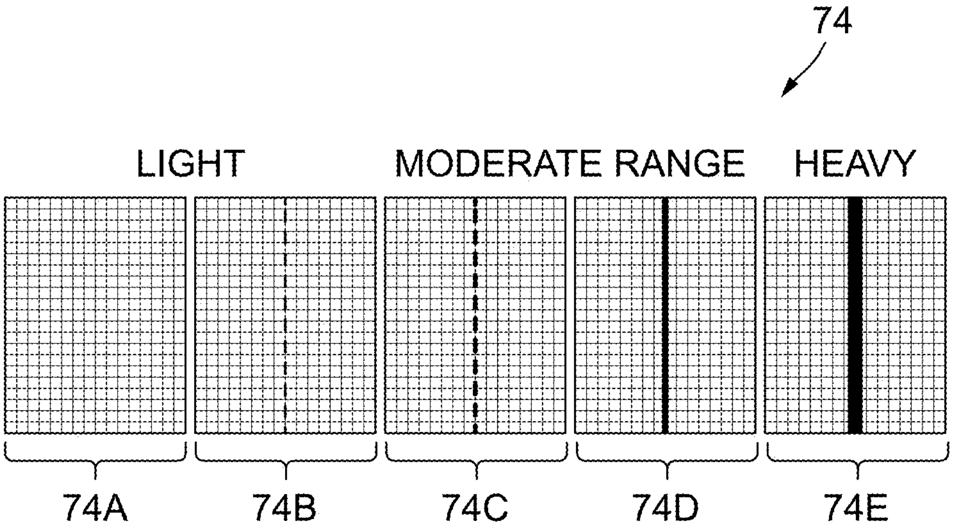
FIG. 7A is an exemplary scoring impression image guide, according to an example embodiment of the present disclosure.
Figure 7B:
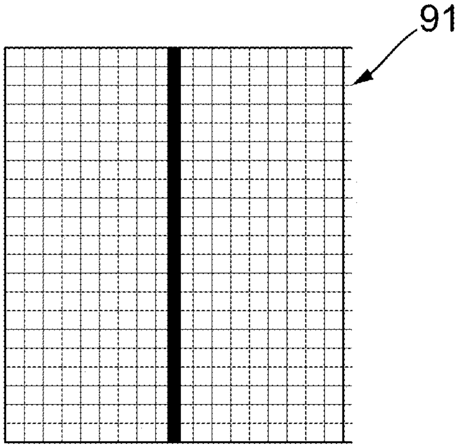
FIG. 7B is an exemplary scoring impression image, according to an example embodiment of the present disclosure.
Figure 7C:
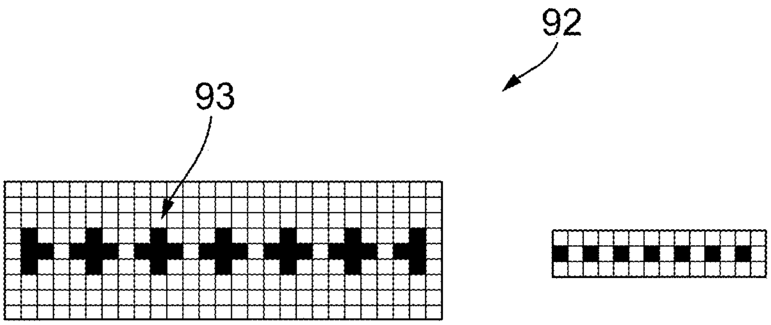
FIG. 7C is an exemplary max pooling of the image of FIG. 7B, according to an example embodiment of the present disclosure.
Figure 7D:
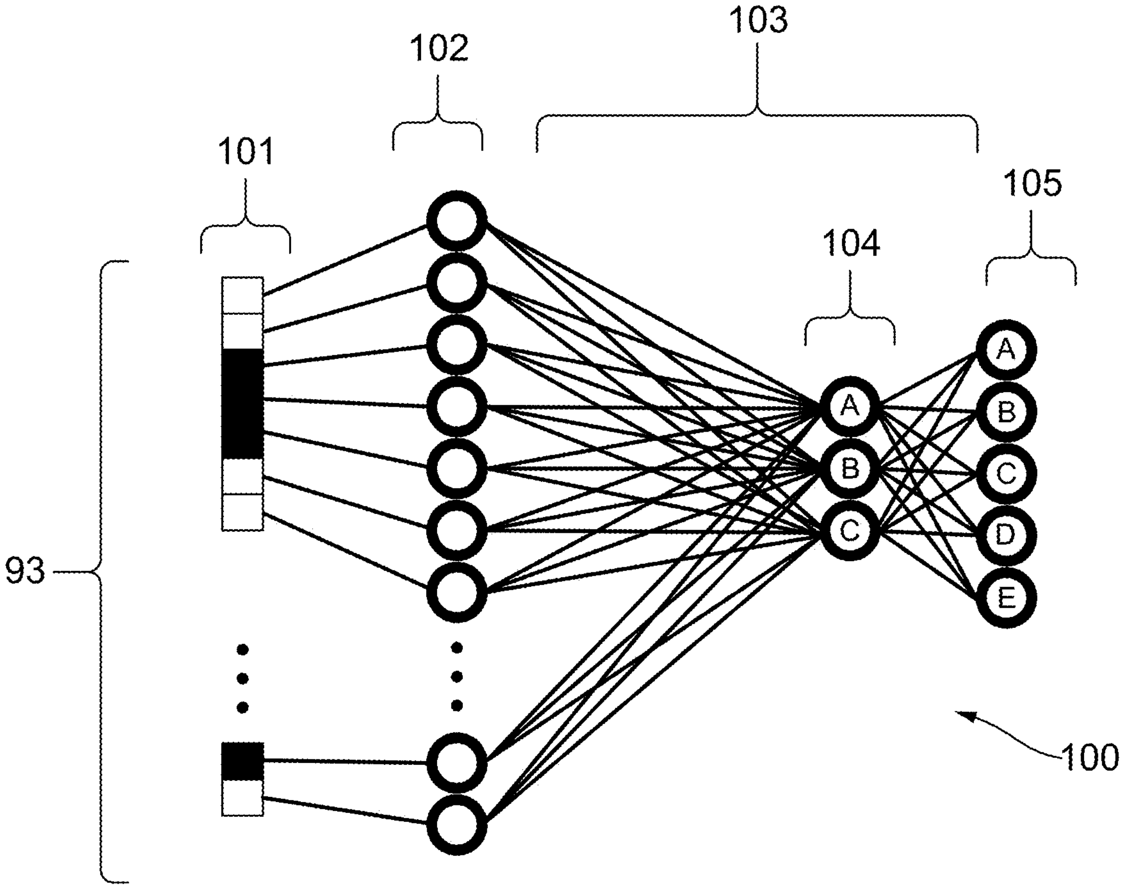
FIG. 7D is a schematic of an exemplary deep learning method how to classify rotary scoring device impressions by using convolutional filters to feed imagery grayscale intensity values into a convolutional neural network, according to an example embodiment of the present disclosure.
Figure 8:
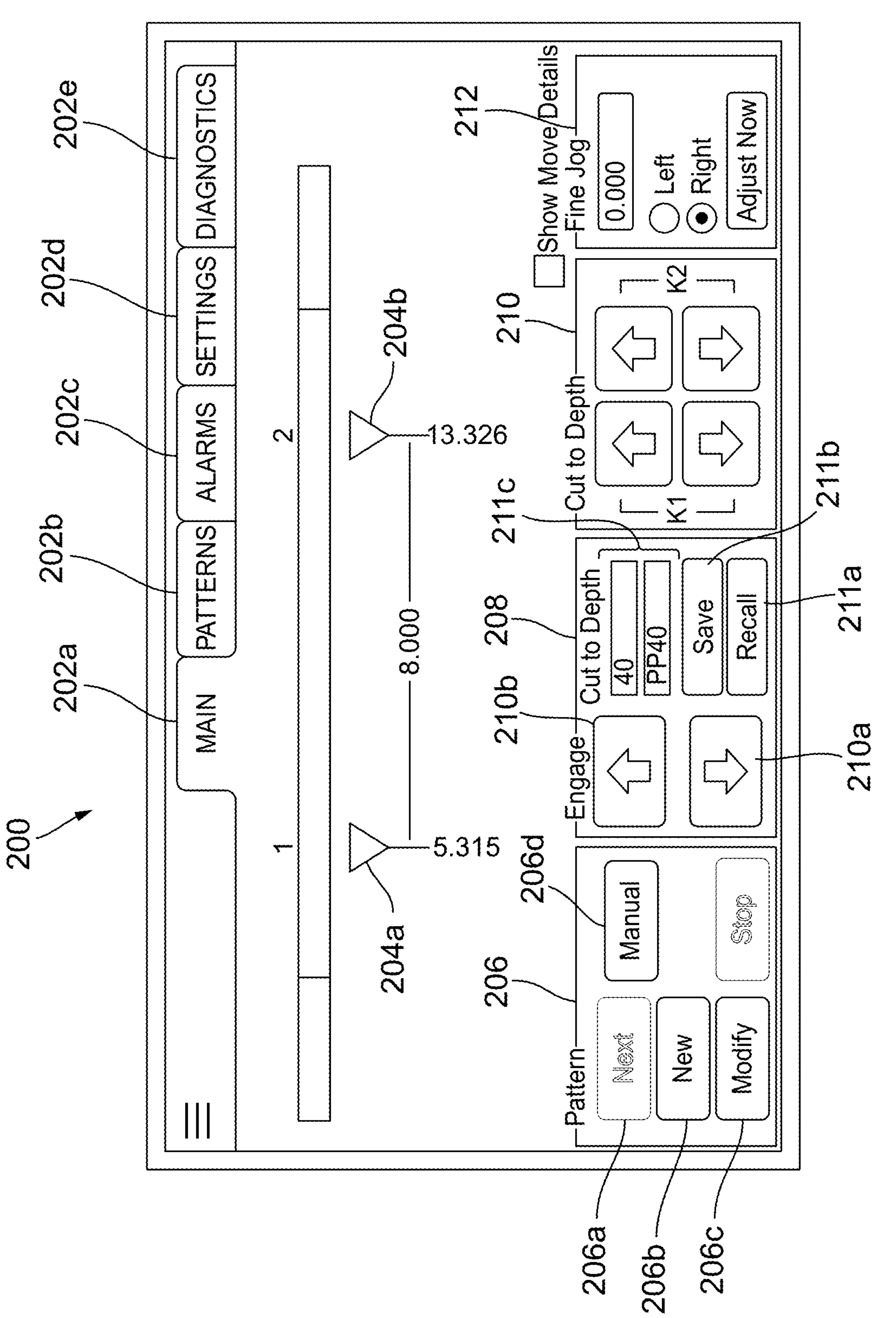
FIGS. 8-13 are display representations showing an exemplary display of a rotary scoring system, according to an example embodiment of the present disclosure.

For example, referring to FIGS. 7A-7D, from an exemplary blade impression image 91 (FIG. 7B), an exemplary max pooling 92 (FIG. 7C) is convolved, extracting back score witness marks 93 (FIG. 7C) for use in a neural network 100 (FIG. 7D). That is, in neural network 100, information from witness marks 93 from max pooling 92 is transported and flattened in a one-dimensional array 101 that is provided as nodes of an input layer 102 that are assigned different values (weights and biases) for calculations, sometimes referred to as perceptrons, in hidden layers 103 to blade impression predictors 104 identified as a light impression predictor 104A, a medium impression predictor 104B, and a heavy impression predictor 104C. The blade impression predictors 104A, 104B, 104C of hidden layers 103 correspond to exemplary output layers 105 identified as, for example, an operator side actuator voltage 105A, a rear side actuator voltage 105B, a belt motor drive speed 105C, predicted blade life remaining 105D, and predicted bearing service date 105E (associated with one or both score blades 83). As a result, in response to being provided with blade impression images 91 at predetermined time intervals or intervals of the material passing therethrough, the neural network 100 operates utilizing a closed feedback loop to permit a continuous operation of the scoring device 10, i.e., operating with or without disruption of the rotary scoring system. In other words, in response to measuring a deviation from a desired state, the controller 36 is adapted to operate in a closed feedback loop for setting a gap dimension of the gap 16 between the blades and the anvil roller. Stated another way, blade cut depth adjustment is determined by the neural network 100.

In some implementations, the neural network 100 permits different weightings in the hidden layer 103 portion to accommodate different preferences of different operators. In other words, such preferences could be changed, corresponding to the working hours of the different operators, and could be performed manually or automatically, such as upon the operator "clocking in" for a work shift.

In some implementations, the neural network operates utilizing one or more sensors sensing parameters in an absence of or prior to separation of the material 30, the backing web 31*b*, and the matrix web 31*a* from one another, and wherein sensing by the one or more sensors occurring with or without disruption of operation of the rotary blade scoring 1.

Feedback to the automated control process may include specifications or measurements pertaining to the scoring device 10, material being cut (e.g., webs 31*a*, 31*b*) or other process parameters affecting the quality of the score.

Example embodiments described herein provide a closed feedback loop or automated control process that is a significant improvement over current manual processes, in which an operator utilizing an exemplary blade impression image guide 74 (FIG. 7A) (images 74A, 74B corresponding to a range of light blade impression, images 74C, 74D corresponding to a range of moderate blade impressions, and image 74E corresponding to a heavy blade impression), must first disrupt operation of the rotary scoring device, review a portion of the webs, determine the deviation from the desired state, make manual adjustment, then restart operation of the rotary scoring device, possibly needing to repeat if the operator's deviation determination was incorrect. As such, the exemplary automated control processes described herein resolve the aforementioned problems of the current manual processes.

In some implementations, controller 36 employs AI methods to control the rotary scoring device 10. In other implementations, controller 36 employs machine learning methods to control the rotary scoring device 10. In other implementations, controller 36 employs deep learning methods to control the rotary scoring device 10. Accordingly, present exemplary machine learning as described herein learns how to classify scoring by using convolutional filters to feed imagery grayscale intensity values into a neural network. For example, output of the neural network is assigned to actuators that perform blade clearance & parallel adjustments. The machine learns optimal settings by assignment of appropriate weights & biases for all perceptrons in each hidden layer.

In some implementations, the neural network is deployed with the ability to perform training on demand at the location of deployment or remotely from an offsite location, both occurring either during operation or not.

In some implementations, a custom neural network is constructed for isolated or combined parameters present within the control unit 32 or process (i.e., customer neural networks for each different type of web material, each different scoring device, each different blade, each different cut depth setting, each different line speed setting, etc.).

Referring now to FIGS. 8-13, which illustrate example embodiments of a display on the display device 51 for inputting control instructions to controller 36 for operating the scoring device 10. In one implementation, with reference to FIG. 8, the display includes a graphical user interface configured as a tab layout 200 including five tabs, such as, Main tab 202*a*, Patterns tab 202*b*, Alarms tab 202*c*, Settings tab 202*d*, and Diagnostic tab 202*e*. In main tab 202*a*, indicators 204*a* and 204*b* are shown corresponding to the actual locations of the respective blade holders 12 in real-time measured by the electromagnetic transducer 61. Main tab 202*a* further includes a Pattern selection block 206, an Engage/Disengage selection block 208, a Cut- to Depth selection block 210, and a Fine Jog selection block 212. The Pattern selection block 206 permits the user to choose which pattern to select for operation. The pattern can be selected from at least one of a next pattern 206*a*, a new pattern 206*b*, a modify pattern 206*c*, or a manual pattern 206*d*. The Engage/Disengage selection block 208 indicates the status of the score blades 83 on the anvil roller 14, where button 210*a* (i.e., down arrow button) indicates the score blades 83 are engaged (in contact) with the anvil roller 14, and button 210*b* (i.e., up arrow button) indicates score blades 83 are disengaged (not in contact) with the anvil roller 14. Recall interface 211*a* and Save interface 211*b* permit the user to select parameters for saved materials for scoring upon a saved library (previously configured materials). The user may choose from a previously saved material by selecting the recall interface 211*a* or an existing material by selecting the Save interface 211*a*. Once the material is selected, the selected material is displayed at window 211*c* to indicate the selected material. In one implementation, window 211*c* represents the type of material (i.e., PP40) and cut depth (e.g., 40 mil). The Cut- to Depth selection block 210 indicates fine tuning (i.e., minor adjustment) of the respective blades 12. Each blade 12 can be separately adjusted (moved) independent from each other. In one implementation, the up arrow moves the blades upward for further disengagement and the down arrow moves the blades downward for further engagement. In other implementations, the up arrow may have a first color (e.g., red) for disengagement and the down arrow may have a second color (e.g., green) for engagement. The Fine Jog selection block 212 indicates moving both blade holders 12 to either the user side or the machine side to adjust for finer web alignment.

Figure 9A:
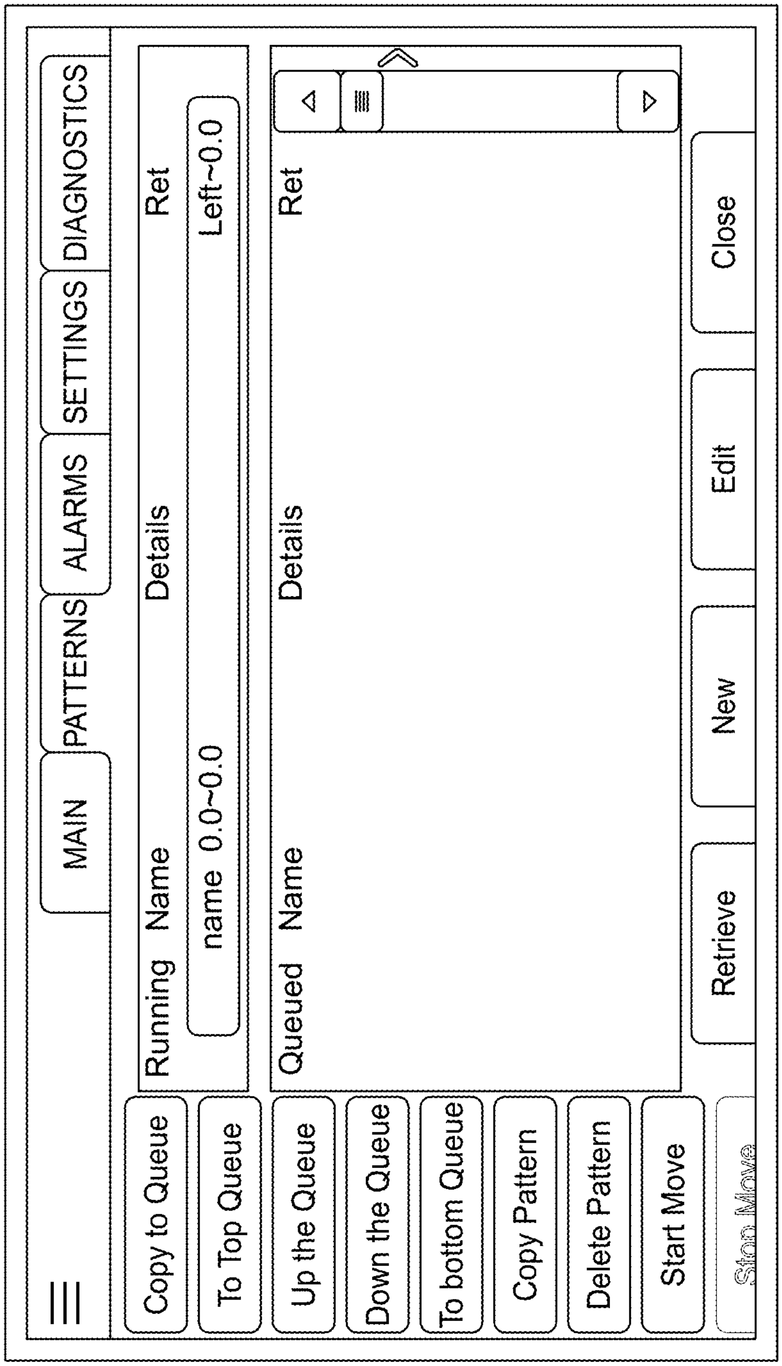

FIG. 9A illustrates the Patterns tab 202*b* when selected. In this tab, pattern history and queue of material can be accessed for a particular job. In addition to the saved history, the Pattern tab 202*b* permits the user to save and edit the current job for future use. It should be appreciated that other parameters can be saved and retrieved, such as, but not limited to, material name, material type, material serial number or identifier, material caliper, material basis weight, material tensile strength, material elasticity, machine measurements, individual score blade diameter, machine settings, or conditions at the time a parameter was saved, etc.

Figure 9B:
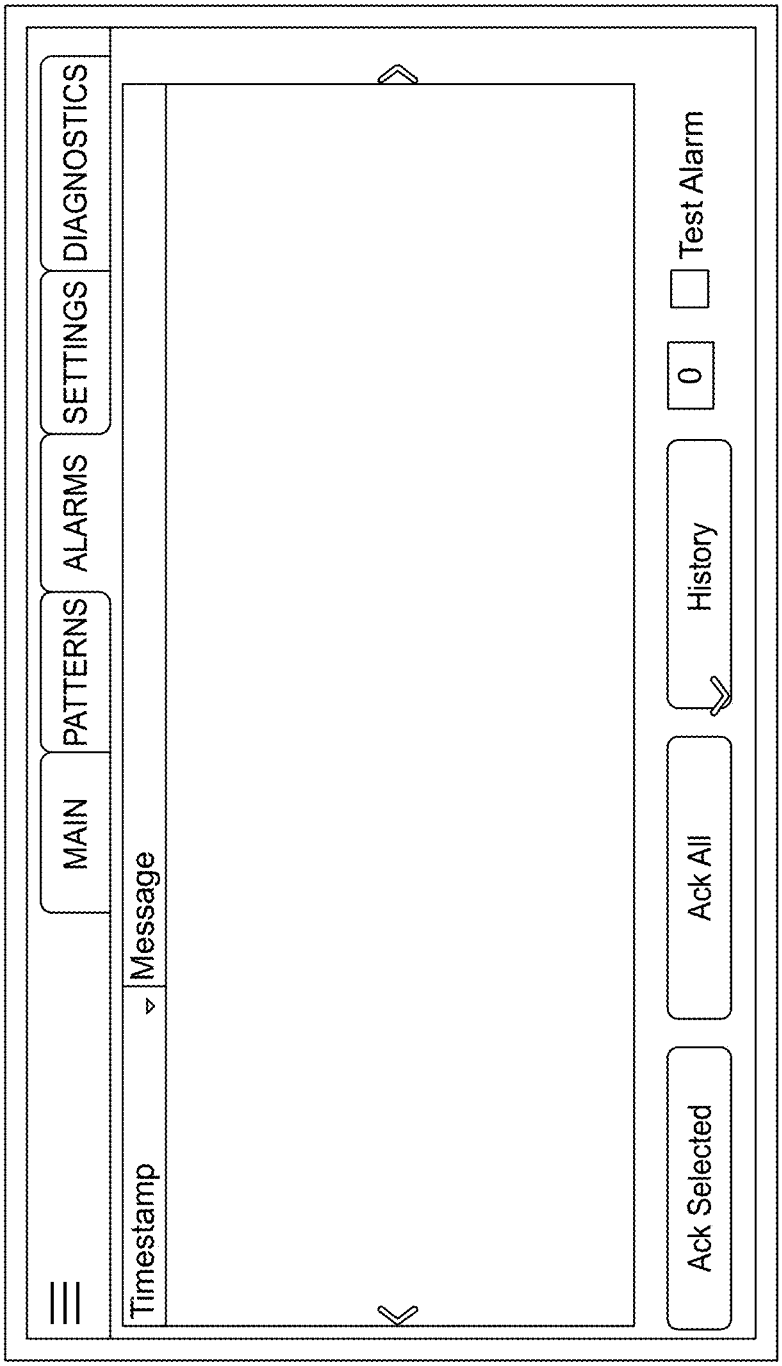

FIG. 9B illustrates the Alarms tab 202*c* when selected. In this tab, history diagnostic alarms are displayed and saved to indicate previous malfunctions, such as, but not limited to, blade clash.

Figure 10A:
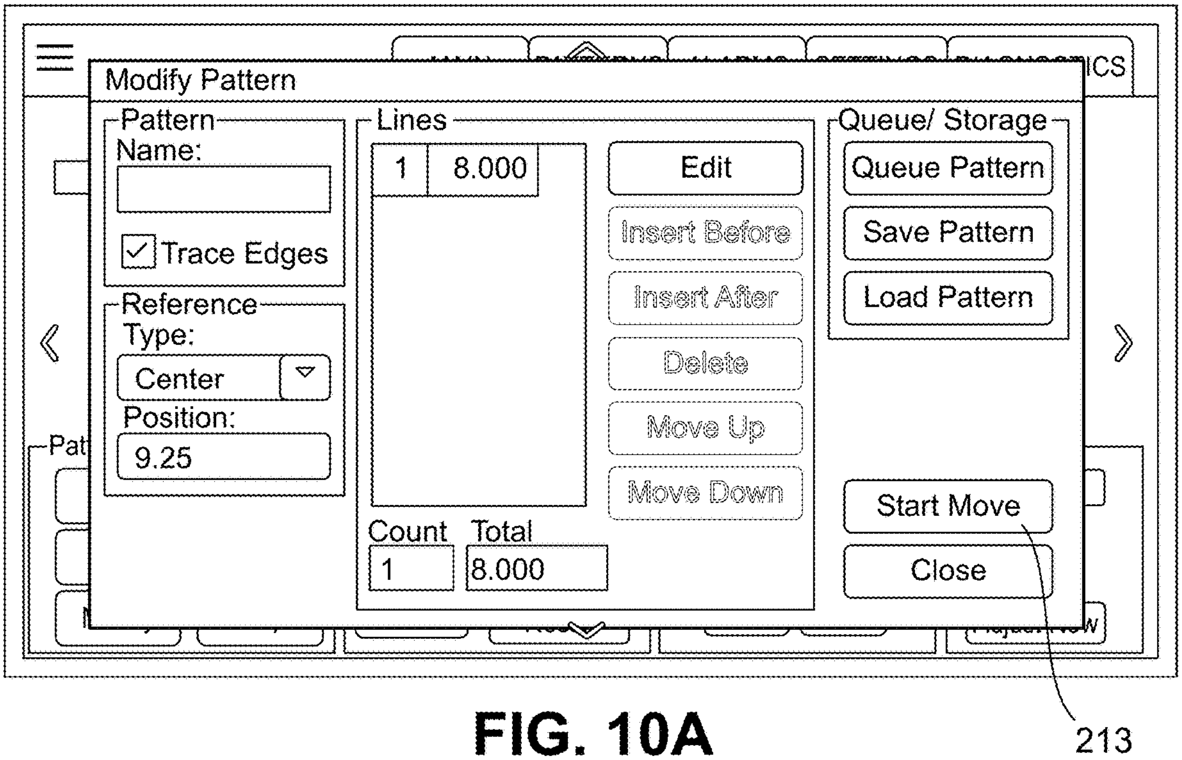
Figure 10B:
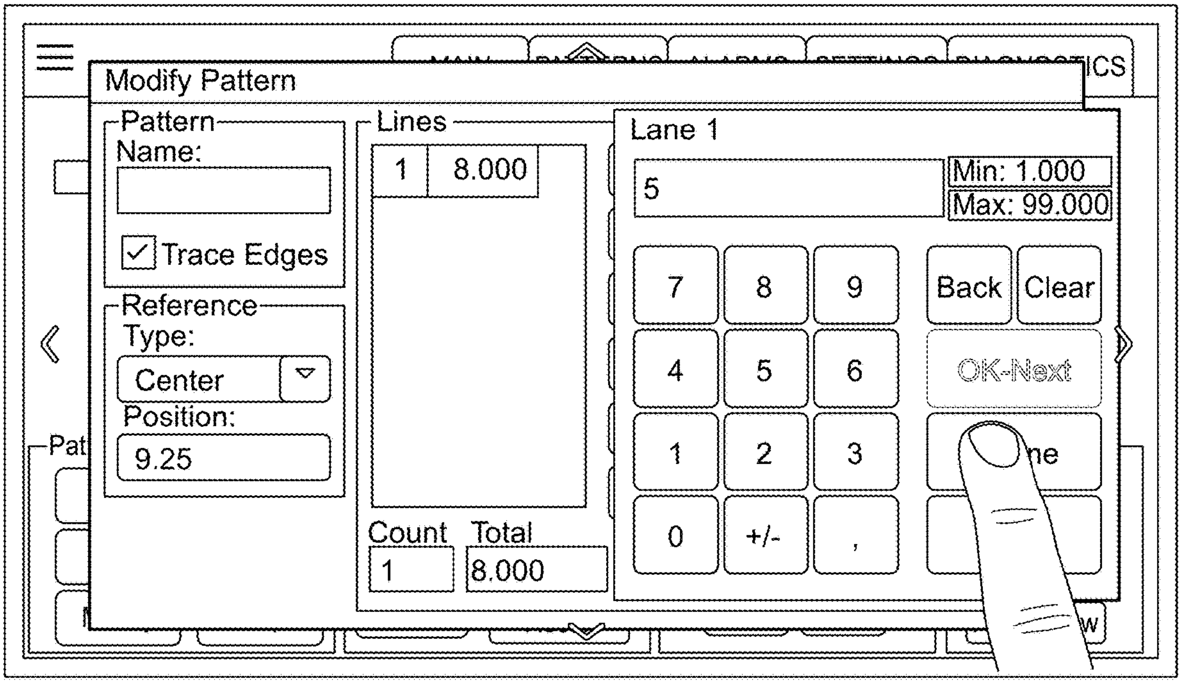
Figure 11A:
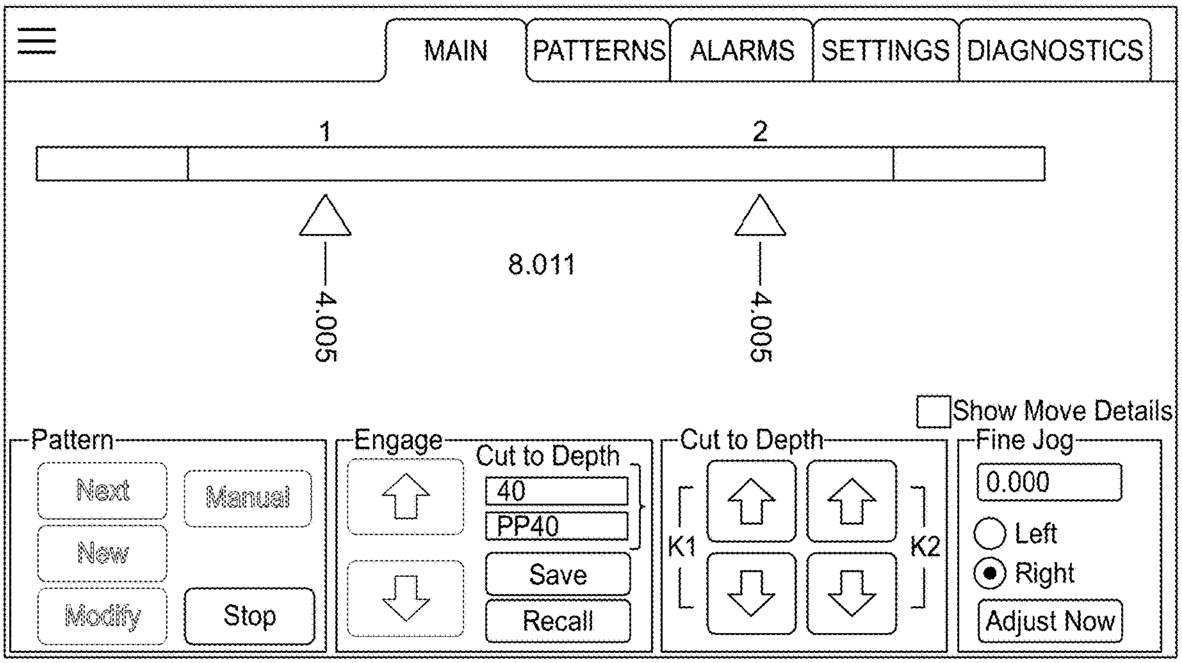
Figure 11B:
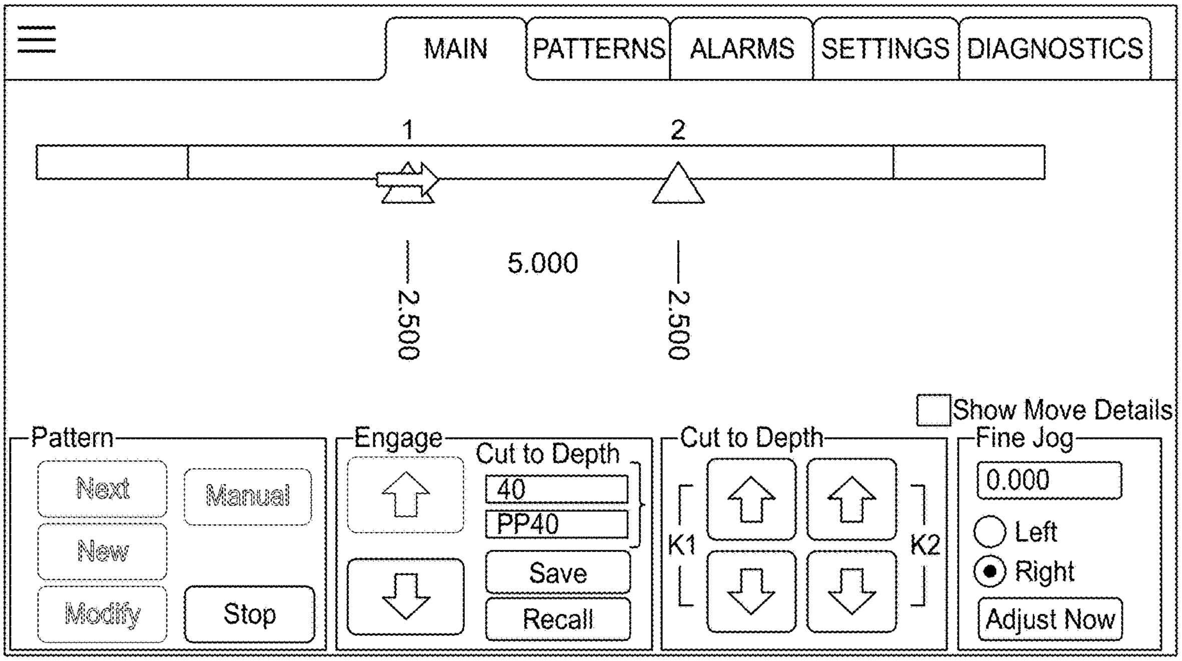

To illustrate an exemplary operation using an exemplary sample material (i.e., 6 in. wide), the user selects the modify interface 206*c* from the Pattern selection block 206 of Main tab 202*a*, as shown in FIG. 10A, to modify the existing pattern for the selected material. Since the sample material is six inches wide, the user needs to change the width of the blade holders 12 to at least 5 inches to modify the existing pattern, i.e., change from 8 inches to 5 inches (FIG. 10B). Once the appropriate width is entered (i.e., 5 inches), the start move interface 213 is selected to set the blade holders 12 to their desired location. As shown in FIG. 11A, the score blades 83 will retract, if the score blades 83 were in the engaged position, for a predetermined time (i.e., 10 sec) until the bladed 83 are fully disengaged, and subsequently the blade holders 12 will move to their respective desired locations (i.e., 5 in. apart), as shown in FIG. 11B.

Alternatively, if a new sample material is used to be treated, the user selects the new interface 206*b* from the Pattern selection block 206 and enters the parameters or configuration, i.e., type of material, thickness of material, blade holder positions, cut-to depth, etc. for operation. Subsequently, the user may save the parameters or configuration to the library to be used in future use.

Figure 12:
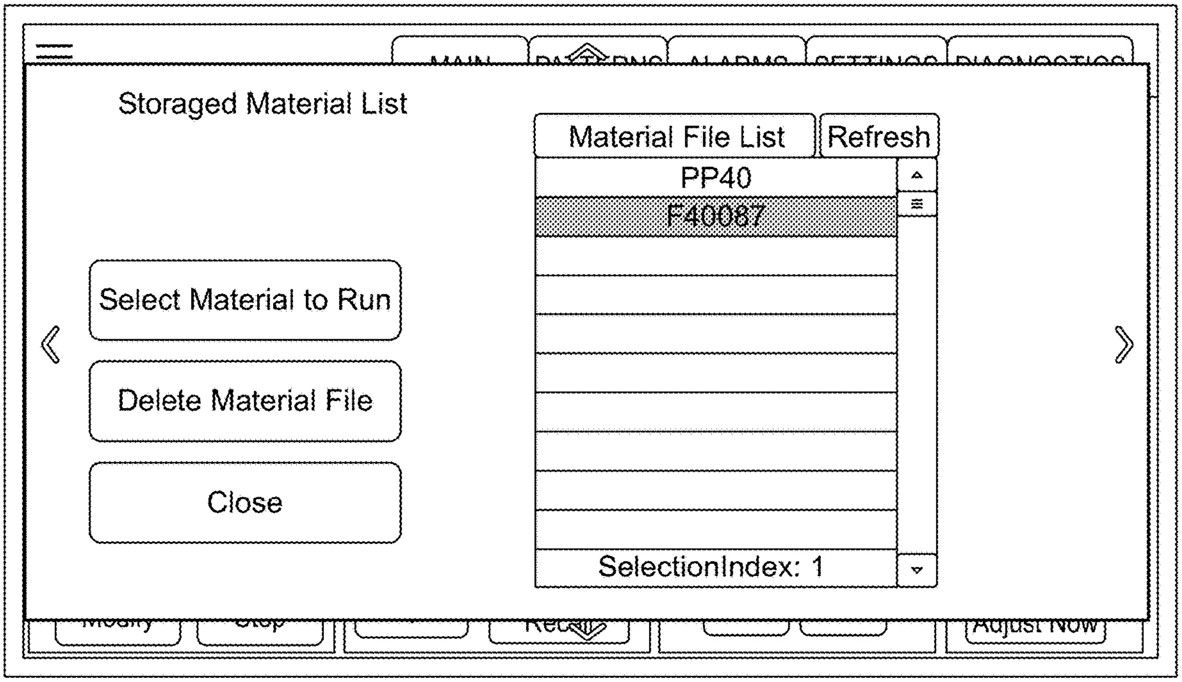
Figure 13:
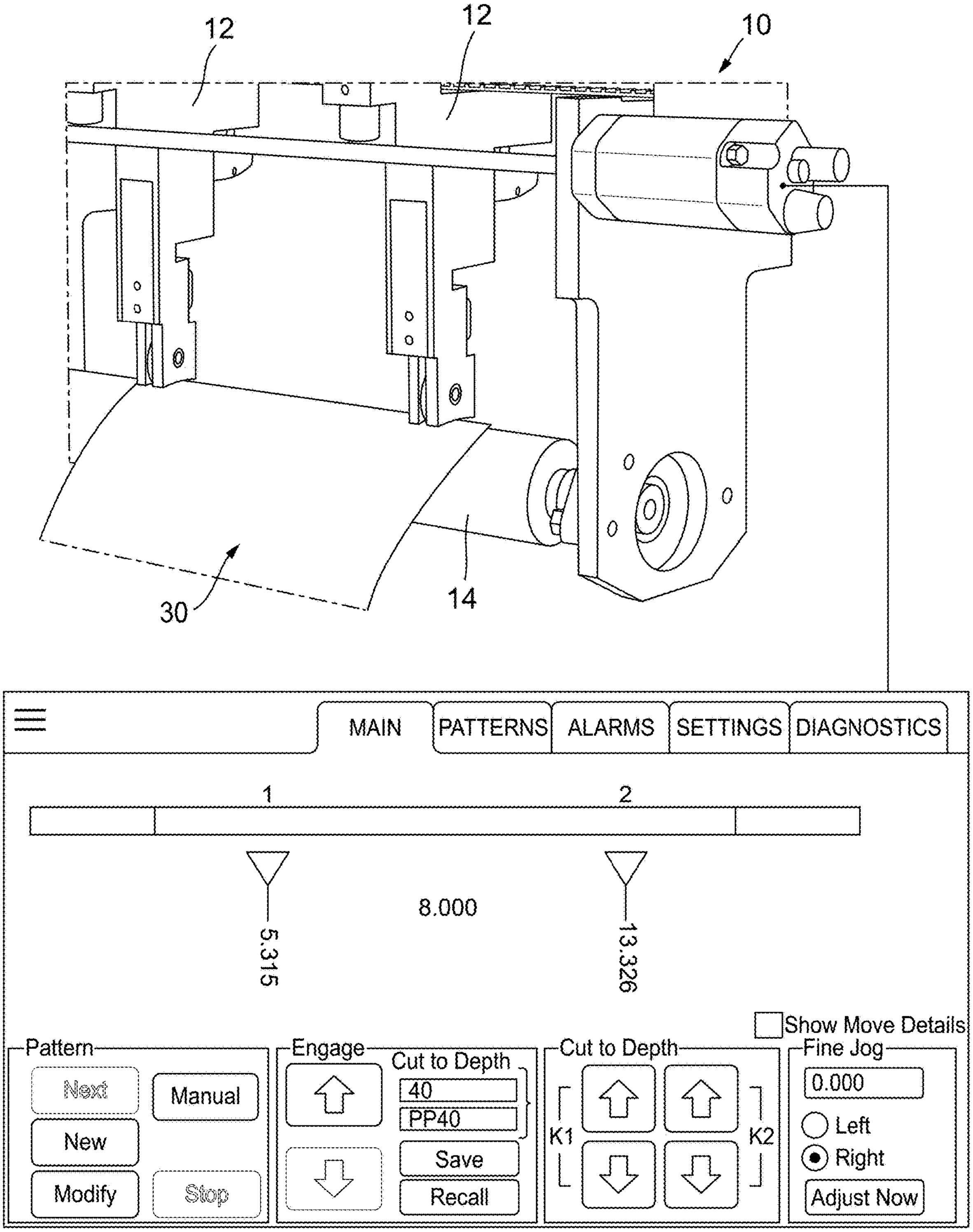

Next, referring to FIG. 12, the selection of the material to run is selected. By way of example, the selected material (e.g., 4 mil vinyl material) is recalled from a saved library to be selected. In this case, the saved material corresponding to the sample material is entitled "F40087." Once the saved material selection is selected from the saved library and the blade holders 12 set in position, the score blades 83 engages the sample material for scoring operation. In one implementation, the indicators 204*a* and 204*b* can turn a different color (e.g., green from red) to indicate that the score blades 83 are engaged for operation.

Figure 14:
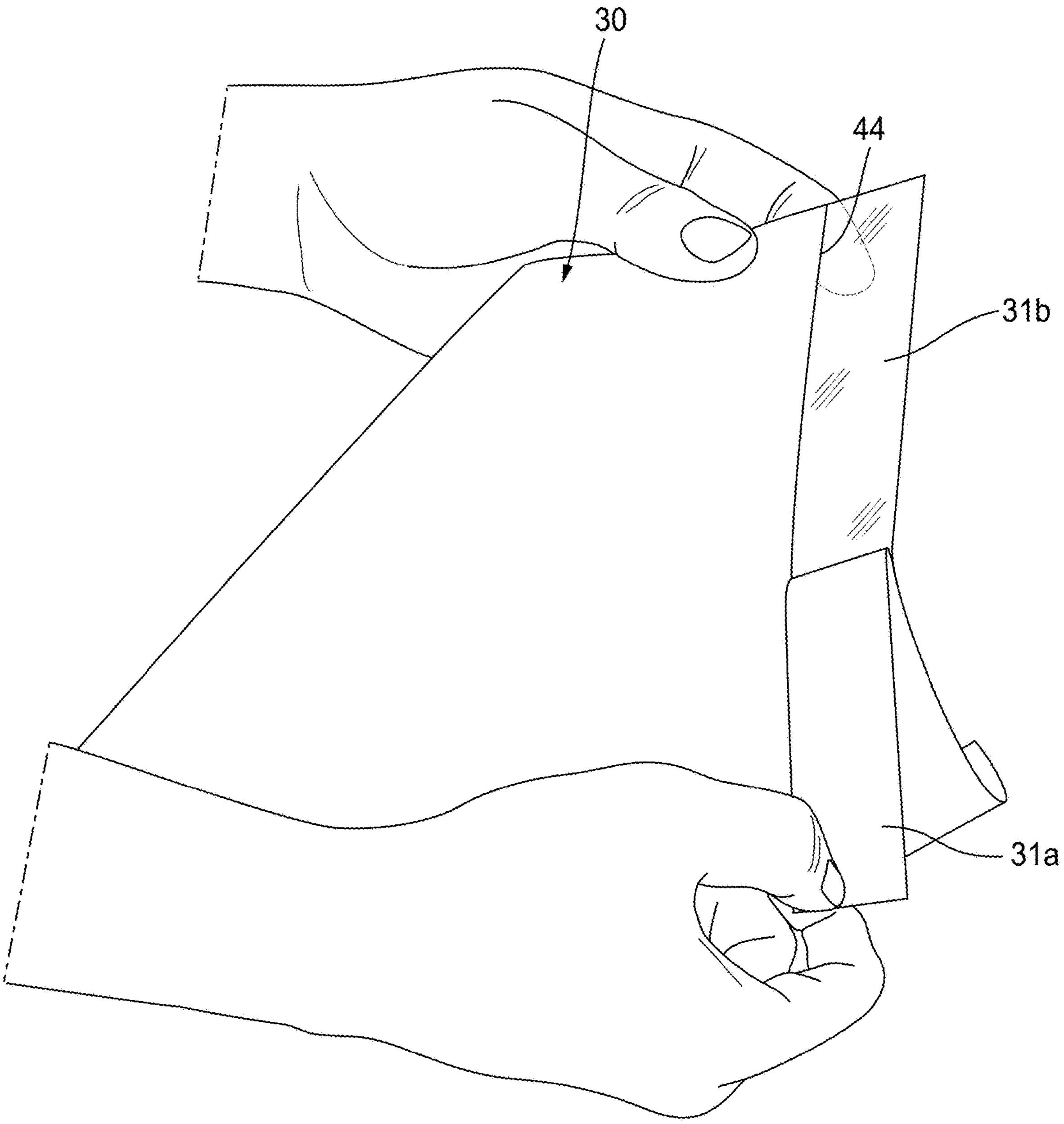
FIG. 14 is a perspective view of an exemplary end material, according to an example embodiment of the present disclosure.

FIG. 14 illustrates an exemplary end web material with the scoring operation. In one implementation, a top score 44 is employed on the web material 30, wherein a top layer 31*a* of material is scored, leaving a support material 31*b* untouched. As shown, the end user can remove the cut top layer material 31*a* out from the support material 31*b*. The cut goes just deep enough to penetrate the top surface leaving the backer support material 31*b* intact.

Surprisingly, results including the deep learning method used for impression characterization handles both transparent and opaque materials with equal effectiveness. Another result is the high accuracies that are attainable with little training.

In some implementations, the present rotary scoring system can be merged in a rotary die cutting system that comprises a rotary die cutting device including a die cutting cylinder and a counter pressure cylinder separated from the die cutting cylinder by a gap, as described in U.S. patent application Ser. No. 17/217,226, and herein incorporated by reference. In addition to controlling the rotary scoring system, the control unit may correspondingly, or alternatively separately control both the rotary die cutting device and the rotary scoring system to actuate an adjusting device(s) to adjust for the axial position and/or gap dimension. In one implementation, the rotary die cutting system is positioned in series with respect to the rotary scoring system.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for setting an axial position and gap dimension of a gap between one or more score blades and an anvil shaft of a rotary scoring device, comprising:

providing a control system including a controller, at least one sensor, and at least one adjusting device actuated by the control system; and actuating the at least one adjusting device in response to the at least one sensor sensing a deviation from a desired state, thereby setting the axial position or the gap dimension between the one or more score blades and the anvil shaft, wherein actuating the at least one adjusting device is achieved as a result of the control system operating in a closed feedback loop, wherein sensing by the at least one sensor occurring with or without disruption of operation of the rotary scoring device.

2. The method of claim 1, wherein actuating the at least one adjusting device in response to the at least one sensor sensing the deviation from the desired state includes inputs from a user selected from a saved library of parameters.

3. The method of claim 2, wherein the parameters include at least one of material name, material type, material serial number or identifier, material caliper, material basis weight, material tensile strength, material elasticity, machine measurements, individual score blade diameter, machine settings, ambient temperature, or conditions at the time a parameter was saved.

4. The method of claim 1, wherein actuating the at least one adjusting device in response to the at least one sensor sensing the deviation from the desired state includes components in misalignment or tolerance stack-ups that cause positional variation between the one or more score blades and the anvil shaft dependent on the score blade diameter and positioning along the anvil shaft.

5. The method of claim 1, wherein actuating the at least one adjusting device in response to the at least one sensor sensing the deviation from the desired state includes a change in thickness of at least one of a backing web or an overlying second web.

6. The method of claim 1, wherein actuating the at least one adjusting device in response to the at least one sensor sensing the deviation from the desired state includes at least one of a change of material of at least one of a backing web and an overlying second web, a thermal expansion of the material, a change in humidity of an environment surrounding the rotary scoring device, a change in a tension gradient of at least one of the backing web and the overlying second web, a cut depth of the score lines and the matrix web, an impression quality of the score lines and the matrix web, or a deflection from an undefined load.

7. The method of claim 1, wherein the control system employs AI methods to control the rotary scoring device.

8. The method of claim 1, wherein the control system employs machine learning methods to control the rotary scoring device.

9. The method of claim 1, wherein the control system employs deep learning methods to control the rotary scoring device.

10. The method of claim 1, wherein the rotary scoring device operates a top score or a back score.

11. A method for operating a rotary scoring device, comprising:

feeding a material web to be treated into a feed of the rotary scoring device;

sending data associated with at least one characteristic property of the material web, measured by at least one sensor, to a control unit;

operating an adjusting device to adjust an axial position of one or more score blades;

operating a motor to adjust a gap dimension between the one or more score blades and an anvil shaft, the motor including an encoder to send a feedback signal, to determine at least one of speed, RPM, count, distance or direction; and setting the axial position and the gap dimension between the one or more score blades and the anvil shaft to a desired location to treat the material web.

12. The method of claim 11, wherein sending data associated with the at least one characteristic property of the material web to the control unit includes measuring a thickness of the material that includes a face web material and a backing web material remaining subsequent to being directed between the one or more score blades and the anvil shaft, in which the measurement occurs subsequent to or prior to removal of the face web material.

13. The method of claim 11, wherein sending data associated with the at least one characteristic property of the material web to the control unit includes determining an exact position of a leading end and a trailing end of the web material fed to the rotary scoring device.

14. The method of claim 11, wherein setting the axial position and the gap dimension between the one or more score blades and the anvil shaft to the desired location to treat the material web includes inputs from a user selected from a saved library of parameters.

15. The method of claim 14, wherein the parameters include at least one of material name, material type, material serial number or identifier, material caliper, material basis weight, material tensile strength, material elasticity, machine measurements, individual score blade diameter, machine settings, ambient temperature or conditions at the time a parameter was saved.

16. The method of claim 11, wherein the rotary scoring device operates a top score or a back score.

17. A method for setting a gap of a rotary die cutting system, comprising:

providing a control system including a controller, at least one sensor, a first adjusting device, and a second adjusting device, each actuated by the control system;

actuating the first adjusting device in response to the at least one sensor sensing a deviation from a desired state, thereby setting a gap dimension between a rotary die cutting device and a counter pressure cylinder of a rotary die cutting device; and actuating the second adjusting device in response to the at least one sensor sensing a deviation from a desired state, thereby setting an axial position and a gap dimension between one or more score blades and an anvil shaft of a rotary scoring device, wherein the rotary scoring device positioned in series with respect to the rotary die cutting device, wherein actuating the second adjusting device is achieved as a result of the control system operating in a closed feedback loop, and wherein sensing by the at least one sensor occurring with or without disruption of operation of the rotary die cutting system.

18. A rotary scoring device, comprising:

a frame including at least one blade holder, containing a score blade therein, and an anvil shaft, the at least one blade holder is separated from the anvil shaft by a gap; and a control system including a controller, at least one sensor, and a first adjusting device and a second adjusting device actuated by the control system, wherein the first adjusting device is operably connected to the at least one blade holder to adjust an axial position, and wherein the second adjusting device is operably connected to the at least one blade holder to adjust a gap dimension between the score blade and the anvil shaft.

19. The rotary scoring device of claim 18, wherein the first adjusting device is at least one of a belt drive system or a rack and pinion system to operably control a motor to adjust the at least one blade holder to a desired position in relation to a material to be treated.

20. The rotary scoring device of claim 19, wherein the first adjusting device adjusts the at least one blade holder along a lateral linear movement in the frame.

21. The rotary scoring device of claim 18, wherein the at least one blade holder includes two blade holders that are positioned apart at a desired location based on a web material being used.

22. The rotary scoring device of claim 18, wherein the second adjusting device is a motor encoder to operably control a motor to adjust the score blade to a desired depth in relation to a material to be treated.

* * * * *